US010444800B2

(12) United States Patent
Sullivan et al.

(10) Patent No.: US 10,444,800 B2
(45) Date of Patent: Oct. 15, 2019

(54) SYSTEM FOR PROTECTING HEADSET COMPONENTS FROM SUNLIGHT

(71) Applicants: Scott Sullivan, San Francisco, CA (US); Phillip Lucas Williams, Glendale, CA (US); Jason Alderman, Duarte, CA (US); Jean-Paul Labrosse, Altadena, CA (US)

(72) Inventors: Scott Sullivan, San Francisco, CA (US); Phillip Lucas Williams, Glendale, CA (US); Jason Alderman, Duarte, CA (US); Jean-Paul Labrosse, Altadena, CA (US)

( * ) Notice: Subject to any disclaimer, the term of this patent is extended or adjusted under 35 U.S.C. 154(b) by 44 days.

(21) Appl. No.: 15/921,498

(22) Filed: Mar. 14, 2018

(65) Prior Publication Data

US 2018/0267575 A1   Sep. 20, 2018

Related U.S. Application Data

(60) Provisional application No. 62/471,366, filed on Mar. 15, 2017.

(51) Int. Cl.
| | |
|---|---|
| *G06F 1/16* | (2006.01) |
| *G02F 1/163* | (2006.01) |
| *G02B 26/02* | (2006.01) |

(52) U.S. Cl.
CPC .......... *G06F 1/1656* (2013.01); *G02B 26/02* (2013.01); *G02F 1/163* (2013.01); *G06F 1/163* (2013.01); *G06F 1/1637* (2013.01)

(58) Field of Classification Search
CPC ...... G06F 1/1656; G06F 1/163; G06F 1/1637; G02B 26/02; G02F 1/163

USPC .......................... 359/13, 265–275, 630, 632
See application file for complete search history.

(56) References Cited

U.S. PATENT DOCUMENTS

| | | | | |
|---|---|---|---|---|
| 5,759,044 A | * | 6/1998 | Redmond | ............... G06F 3/012 |
| | | | | 348/383 |
| 9,335,565 B2 | * | 5/2016 | Miller, IV | ............... A42B 3/226 |
| 10,120,413 B2 | * | 11/2018 | Aimone | .................. G06F 3/012 |

* cited by examiner

*Primary Examiner* — Tuyen Tra

(57) ABSTRACT

A system for protecting electronic headset components from sunlight is provided. The headset is secured to a user's head for use and includes an electronic display, a lens, and a battery all secured to a frame structure. The frame structure includes a mask portion which is sized and shaped to fit snugly against the user's face, and a strap for holding the mask to the face. According to the invention, a moveable shield is mounted to a portion of the frame structure, either directly or indirectly, and is designed to move between a stowed position, wherein light from the display may pass freely through the lens to the user's eyes, during use, and a blocking position, wherein sunlight is prevented from passing through the lens and reaching, and damaging, the delicate electronic display. The shield may be sized and shaped to fit both lenses, or each lens, and may pivot or slide between positions, either automatically, or manually. According to an embodiment, the shield may move automatically in response to a control circuit timed according to a particular moment during display of select video content. The shield may be made from any appropriate opaque or diffuse, or translucent material and may even be made from an electrochromic material.

20 Claims, 6 Drawing Sheets

SYSTEM FOR PROTECTING HEADSET COMPONENTS FROM SUNLIGHT

CLAIM OF PRIORITY

This application claims priority from U.S. Provisional Patent Application No. 62/471,366, filed Mar. 15, 2017, entitled: "System for Protecting Headset Components from Sunlight," the contents of which are incorporated herein in their entirety.

BACKGROUND OF THE INVENTION a) Field of the Invention

The present disclosure relates generally to electro-optical headgear, such as virtual reality (VR) goggles, and more particularly to systems for protecting such headgear when the gear is not in use.

b) Description of the Related Art

Virtual Reality (VR) refers to computer-aided generation of realistic images, sounds and other sensations for the purpose of replicating a real environment, often simulating a user's physical presence within the generated scenes. VR headsets (or VR goggles, are often used as the interface, allowing the wearer to enjoy the immersive three-dimensional experience).

There are many different types of VR goggles commercially available today, but they all include a head-worn structure that supports a backlit video display, focusing lenses, and speakers. The display may be dedicated to the device (i.e., non-removable), or an inserted smart-phone.

During use, the display of the VR unit will generate light, conveying images and other information. The transmitted light will pass through the lenses and focus onto the retinas of the user's eyes. These systems are very basic in nature and work well for providing an effective illusion to the user during use.

A problem occurs when the user removes the VR headset and stores or places it down at a location that is receiving or will eventually receive sunlight. When sunlight aligns with either of the two lenses, the lens will inevitably focus the already intense beam of light sharply onto the surface of the display. The resulting focused energy quickly damages the delicate display, similar to the effects of a magnifying glass focusing sunlight on human skin. The damaged display will either no longer operate, or will operate with a noticeable and permanent burn mark on the screen. The mark, however slight, will have likely destroyed the immersive illusion experienced by the user, and will have thereby effectively destroyed the VR headset (or inserted smart phone) as well. It is therefore a primary object of the present invention to overcome the deficiencies of the prior art.

It is another object of the invention to provide a system for preventing sunlight from damaging the components of a VR headset, when not in use.

It is yet another object of the invention to provide a VR headset with a mechanism that can selectively protect the optical components from select hazards of the surrounding environment.

SUMMARY OF THE INVENTION

A system for protecting electronic headset components from sunlight is provided. The headset is secured to a user's head for use and includes an electronic display, a lens, and a battery all secured to a frame structure. The frame structure includes a mask portion which is sized and shaped to fit snugly against the user's face, and a strap for holding the mask to the face. According to the invention, a moveable shield is mounted to a portion of the frame structure, either directly or indirectly, and is designed to move between a stowed position, wherein light from the display may pass freely through the lens to the user's eyes, during use, and a blocking position, wherein sunlight is prevented from passing through the lens and reaching, and damaging, the delicate electronic display. The shield may be sized and shaped to fit both lenses, or each lens, and may pivot or slide between positions, either automatically, or manually. According to an embodiment, the shield may move automatically in response to a control circuit timed according to a particular moment during display of select video content. The shield may be made from any appropriate opaque or diffuse, or translucent material and may even be made from an electrochromic material.

The features of this invention, and the manner of attaining them, will become more apparent and the invention itself will be better understood by reference to the following description of the disclosed embodiments taken in conjunction with the accompanying drawings.

DETAILED DESCRIPTION OF THE PREFERRED EMBODIMENTS

By way of overview, the present invention solves an important deficiency with current virtual reality (VR) headsets regarding their susceptibility to damage caused by sunlight entering the seeing lenses when the headset is not being used. Owing to human behavior, most people will not return their VR headsets properly to their sealed and protective storage case after each use and will likely just leave the headset out unprotected on a table or desk when they are not being used. Eventually, sunlight streaming in through nearby windows will find the stranded VR headset and a beam of this light will invariably align with the now exposed lenses of the unprotected headset. The single beam of sunlight will enter either or both lenses and will be focused onto the display screen (or smart phone) within the headset. The resulting focused energy will permanently damage the delicate display screen and possibly other related components of the headset.

Although the present invention is directed to improvements of so-called virtual reality headsets, the invention may be applied to any head worn electronic device that includes a lens and an electronic display screen, including such gear that houses dedicated LED display screens and also gear that selectively receives and "borrows" the display of a user's inserted smart phone. Also, the term "virtual reality" (VR) is meant to include so-called "augmented" (AR) and so-called "mixed reality" (MR) headsets. Also, the term "headset" is meant to include "goggles," "glasses," "masks," and "headgear."

Figure 1:
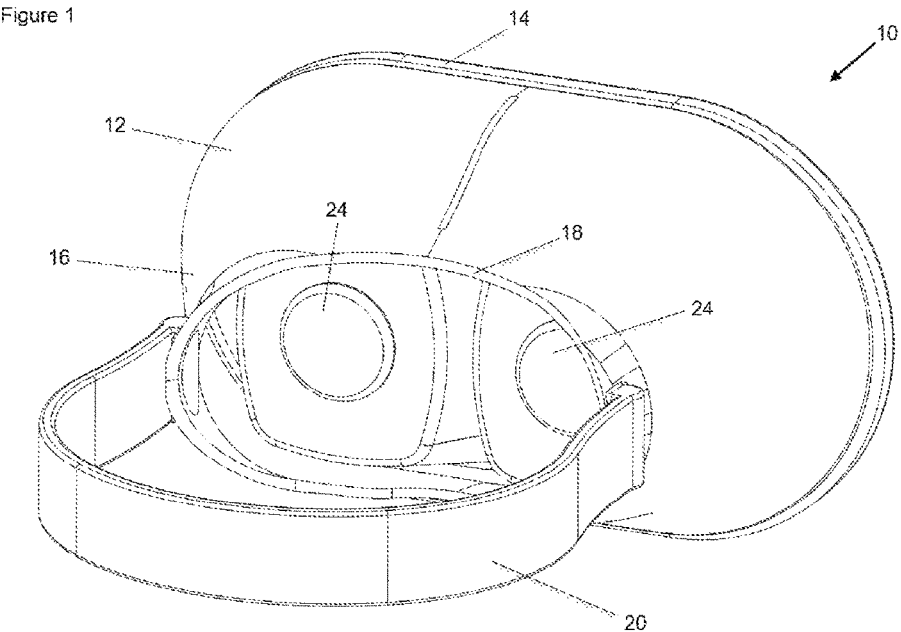
FIG. 1, labeled "PRIOR ART" is a perspective view of an exemplary virtual reality headset, showing a headset body, a headband, and lenses, the figure provided to help explain the deficiencies of the prior art and the features of the present invention.

Referring to FIG. 1, labeled "PRIOR ART", an exemplary conventional VR headset 10 is shown, including a body 12 having a front end 14 and a rear end 16. A shaped facial cutout 18 is formed in body 12 at rear end 16, shaped to snugly and comfortably conform to a user's face (not shown). A headband 20 is secured to body 12 at said rear end 16 at opposing points across cutout 18 and is used to hold body 12 to a user's face during use.

VR headset 10 is a simple device. It is basically two small display screens 22 mounted really close to the user's eyes. Lenses 24 are provided between the user's eyes and the screens 22 to help remove distortion and irregularities in such a manner that an immersive visual experience is created—an experience so real that the user will believe that he or she is actually participating in the scenes being displayed on the screens. It creates an effective illusion on the user's brain. As is often the case with today's high-tech components, the "magic" of virtual reality resides in the software that generates the virtual scenes with such precision as to fool the user's brain into thinking the scenes are real, and really in front of them. The supporting components that project the images to the user's eyes remains relatively basic in form and function.

Figure 2:
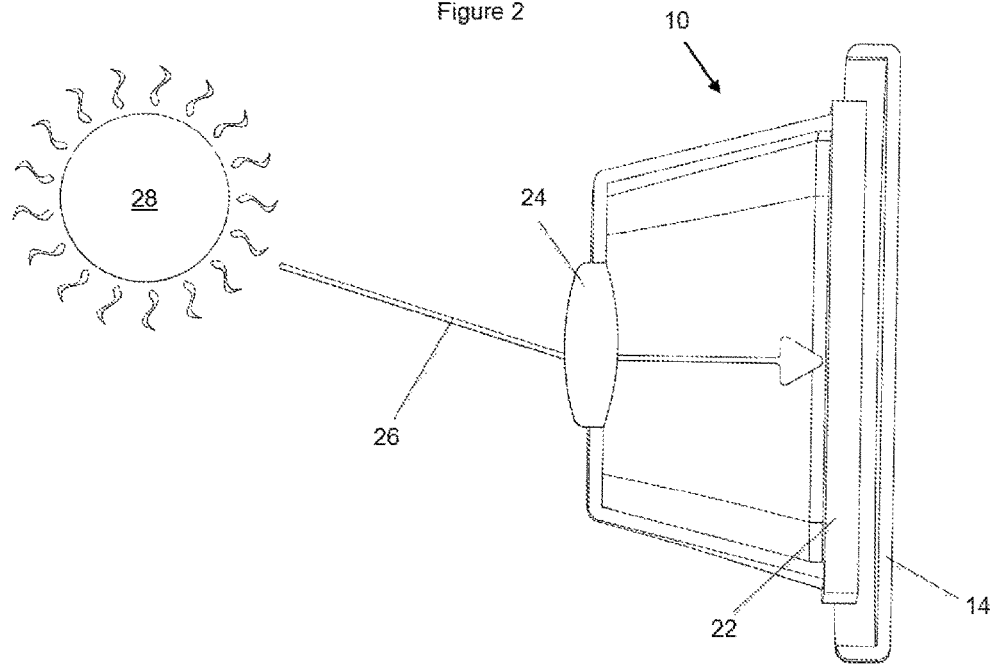
FIG. 2, labeled "PRIOR ART" is a side, sectional view of the VR headset of FIG. 1, cut through the vertical center of one of the two lenses and showing a display panel, the figure provided to help explain how prior art VR headsets are susceptible to sunlight.
Figure 3:
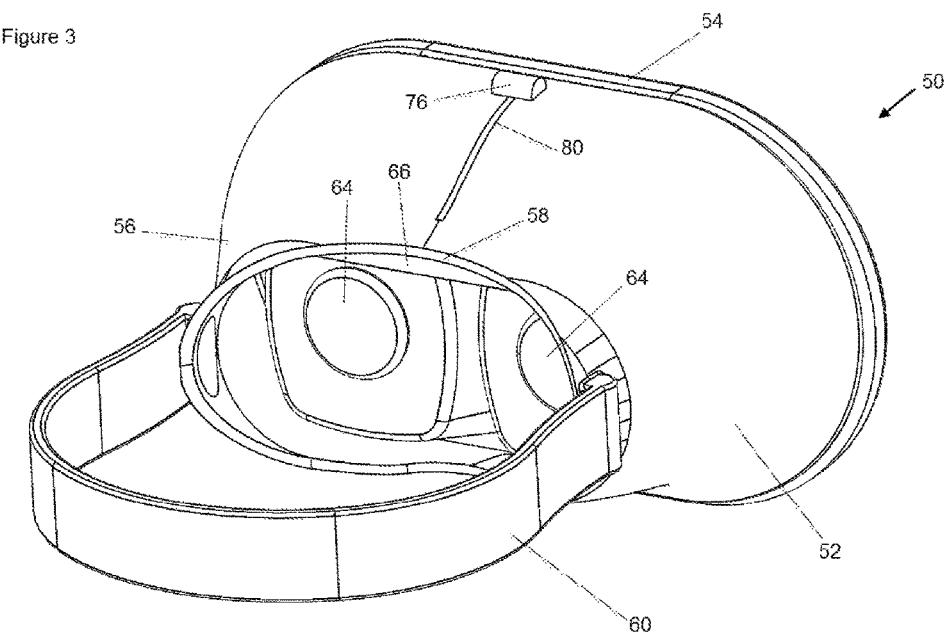
FIG. 3 is a perspective view of a VR headset, according to a first embodiment of the invention, showing details of a headset body, lenses, a headband, and a sunshield, shown in a stowed position and allowing light to pass through the lenses.
Figure 4:
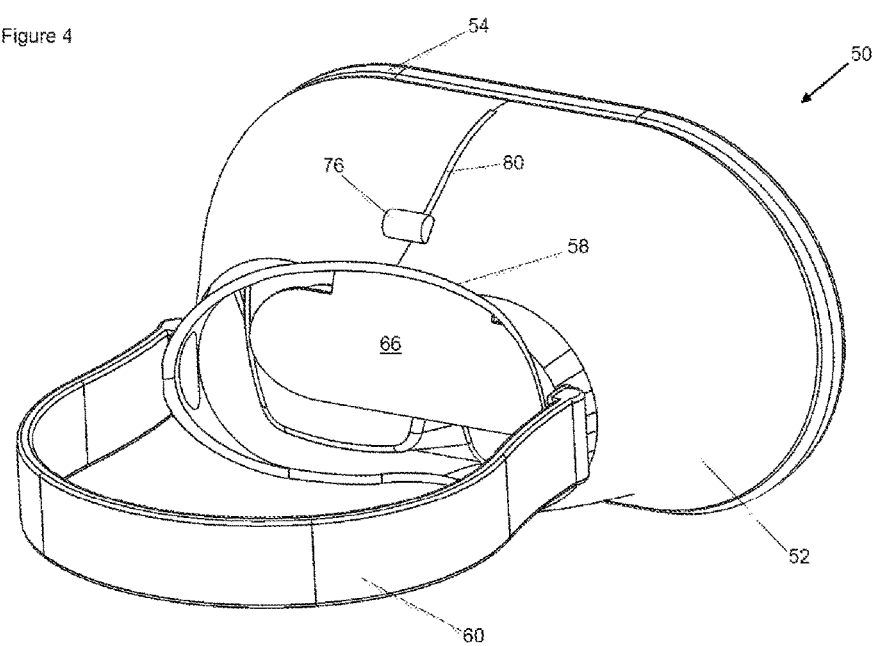
FIG. 4 is a perspective view of the VR headset of FIG. 3, showing the sunshield in a deployed position, protecting the lenses of the VR headset from incoming light, according to the first embodiment of the invention.
Figure 5:
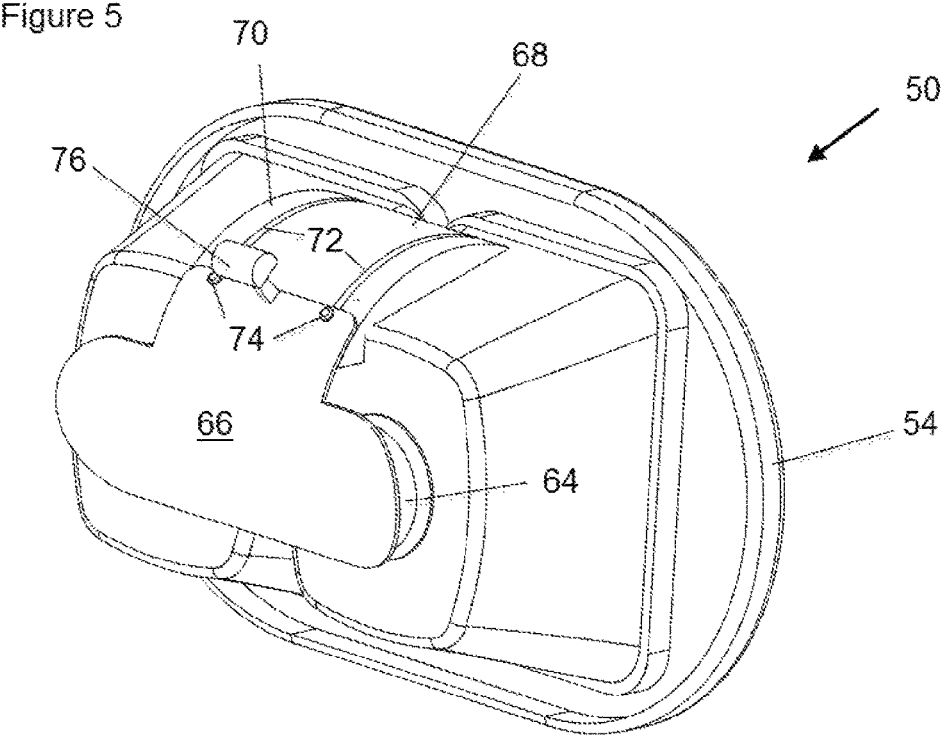
FIG. 5 is a perspective view of the VR headset of FIG. 4, shown without the body and headband to reveal details of the sunshield, shown in the deployed position, according to the first embodiment of the invention.
Figure 6:
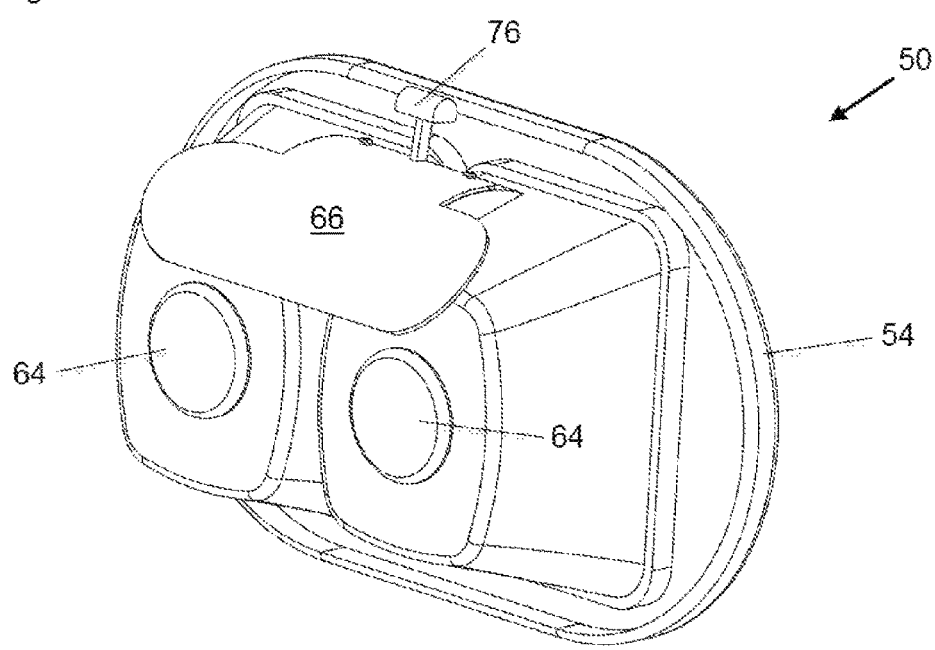
FIG. 6 is a perspective view of the VR headset of FIG. 4, shown without the body and headband to reveal details of the sunshield, shown in the retracted stowed position, according to the first embodiment of the invention.
Figure 7:
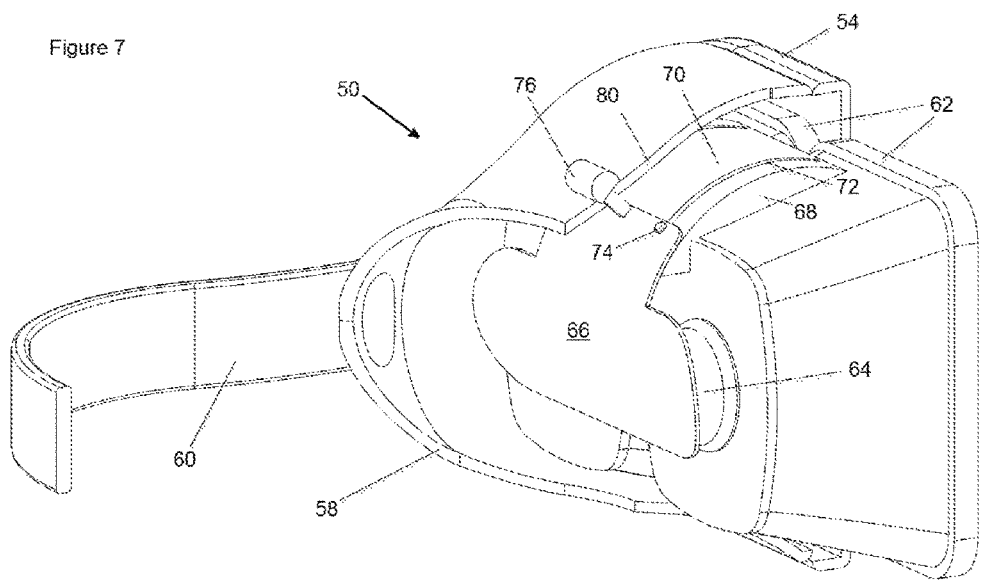
FIG. 7 is a perspective view of the VR headset of FIG. 5, shown with a sectional half of the body and headband to reveal details of the sunshield, shown in the deployed position, according to the first embodiment of the invention.
Figure 8:
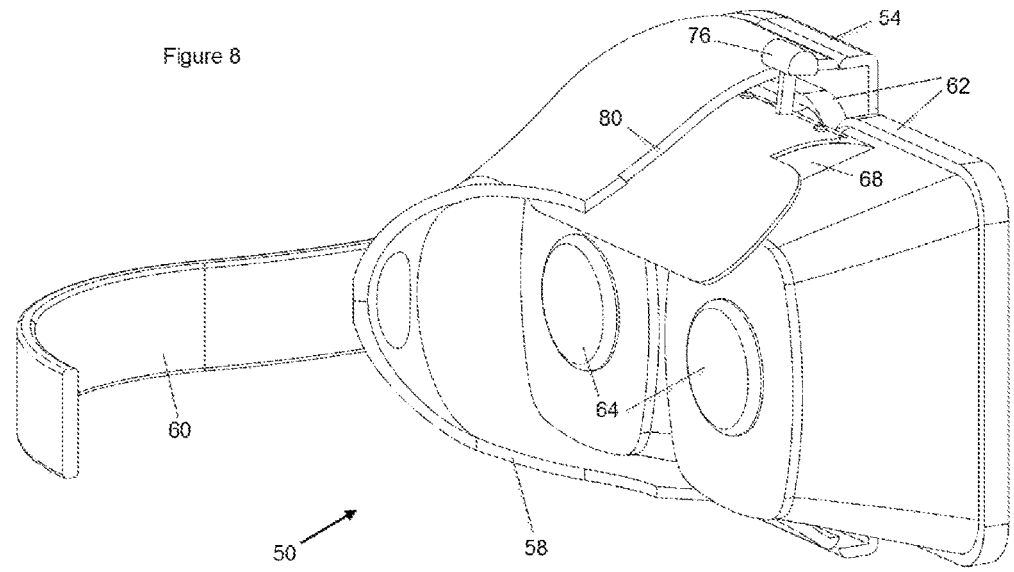
FIG. 8 is a perspective view of the VR headset of FIG. 6, shown with a sectional half of the body and headband to reveal details of the sunshield, shown in the retracted and stowed position, according to the first embodiment of the invention.

Referring to FIG. 2, labeled "PRIOR ART", the problem of exposing lenses to direct sunlight is illustrated wherein a beam of light 26 from the sun 28 aligns with at least one lens 24. The lens focuses the incoming beam onto display screen 22. As mentioned above, the resulting focused high energy may burn or otherwise damage the delicate screen, rendering the VR headset inoperative, resulting in costly repairs or replacement. Referring to FIGS. 3 through 8, and according to a first embodiment of the present invention, an improved VR headset 50 is shown, including many conventional components as before, such as a body 52 having a front end 54 and a rear end 56. A shaped cutout 58 is formed in body 52 at rear end 56, shaped to snugly and comfortably conform to a user's face (not shown). A headband 60 is secured to body 52 at said rear end 56 at opposing points across cutout 58 and is used to hold body 52 to a user's face during use. VR headset 50, further includes display screens 62 mounted within body 52, adjacent to front end 54, and lenses 64, performing a similar function to the lenses 24 used in conventional headsets, described above and shown in FIGS. 1 and 2. According to this first embodiment of the invention, a sunshield 66 is slidably mounted within body 52 of VR headset 50 between a stowed (retracted) position, shown in FIGS. 3, 6, and 8 and a deployed position, as shown in FIGS. 4, 5, and 7. When sunshield 66 is in the stowed or retracted position, lenses 64 are exposed (as conventional lenses 24 always are exposed in a conventional VR headset 10) and light is permitted to pass through each lens in either direction. Sunshield 66 must be in the fully retracted position when VR headset 50 is being used.

In contrast, referring to FIGS. 4, 5, and 7, and according to this first embodiment of the invention, when sunshield 66 is positioned in the deployed position, lenses 64 are effectively covered so that no light may directly pass therethrough to reach display screen 62. VR headset 50 is protected from sunlight damage when sunshield 66 is in the deployed position.

Sunshield 66 may be made from any of several different materials, including plastic or metal, but a strong lightweight and opaque thermoplastic is preferred, such as Acrylonitrile Butadiene Styrene (ABS). The exact shape of sunshield 66 will vary depending on the specific shape of the particular VR headset and the available space provided within body 52. The only requirement is that both lenses must be protected from sunlight when sunshield 66 is in the deployed position. It is preferred that sunshield 66 be curved about a pivoting axis, as shown in FIGS. 5 and 6 so that it may easily and effectively slide between the retracted and deployed positions smoothly. Sunshield 66 is preferably moved between its stowed and deployed positions manually by the user, whenever it is needed. Sunshield 66 essentially functions as lens caps, which cannot be lost. Sunshield 66 is preferably slidably mounted to a guide block 68 which is made from a lubricious plastic, such as Delrin® or Nylon® and having a curved upper surface 70, whose radius matches the curved radius of sunshield 66. The matching curves allow sunshield 66 to smoothly and easily slide along curved guide block 68, when a light force is applied. Slots 72 are formed within guide block 68 through-which rivets 74 smoothly glide. Rivets 74 are secured to an upper end of sunshield 66, as shown in FIGS. 5 and 6 and include heads (not shown) which are larger than slots 72 so that the rivet heads remain within guide block 68, while the rivets themselves may freely slide within slots 72. In operation, sunshield 66 may selectively slide in an arcuate path, as dictated by the curved shape of both sunshield 66 and guide block 68. A simple handle 76 may be secured to a portion of sunshield 66 to allow the user to easily move sunshield up or down as desired. The shape and size of handle 76 will vary according to the structural details of the particular VR headset, but generally, handle 76 would be sized and shaped to move freely within a slot 80 formed within body 52 of headset 50. Handle 76 would be located outside of body 52 and would be accessible by the user of the VR headset.

Regardless of the shape and size of sunshield 66, it may be moved manually, as described above, whenever the headset is not being used, or automatically using any of several drive means, such as servo-motors, solenoids, electromagnetic linear drives, stepper motors, or other. The specific type of drive means will vary depending on the particulars of the VR headset and in any case is well within the scope of general knowledge of a person of ordinary skill in the art and the exact details of such a drive means is therefore beyond the scope of this description. Applicants contemplate a simple over-center spring action mechanism that is activated by a simple push-pull solenoid. When activated, the solenoid would pull the lever that would reposition a tension spring to a point beyond a center point that would cause the spring action to force sunshield 66 from a stowed position, for example, to its deployed position. The sunshield would remain in this position without the solenoid requiring any additional power. When the solenoid is reverse powered so that it pushes the level to reposition the tension spring back across the center point, the spring action would then be applied to raise the sunshield to its stowed position. Spring-bias over-center actions are well known and one of ordinary skill in the art can easily apply such a mechanism to move sunshield 66 in the manner thus described. An additional benefit with the exemplary mechanism described above is that it only requires a pulse of power to activate the solenoid (either push or pull) and should there be an obstruction in the path of any of the moving parts, including sunshield 66, the mechanism would be forgiving and no part of the mechanism would be damaged since the moving parts would yield to any force greater than the force of the spring in the system. Also, the obstruction would not be damaged, or injured, in the case that the obstruction is a user's finger, or other.

Figure 9:
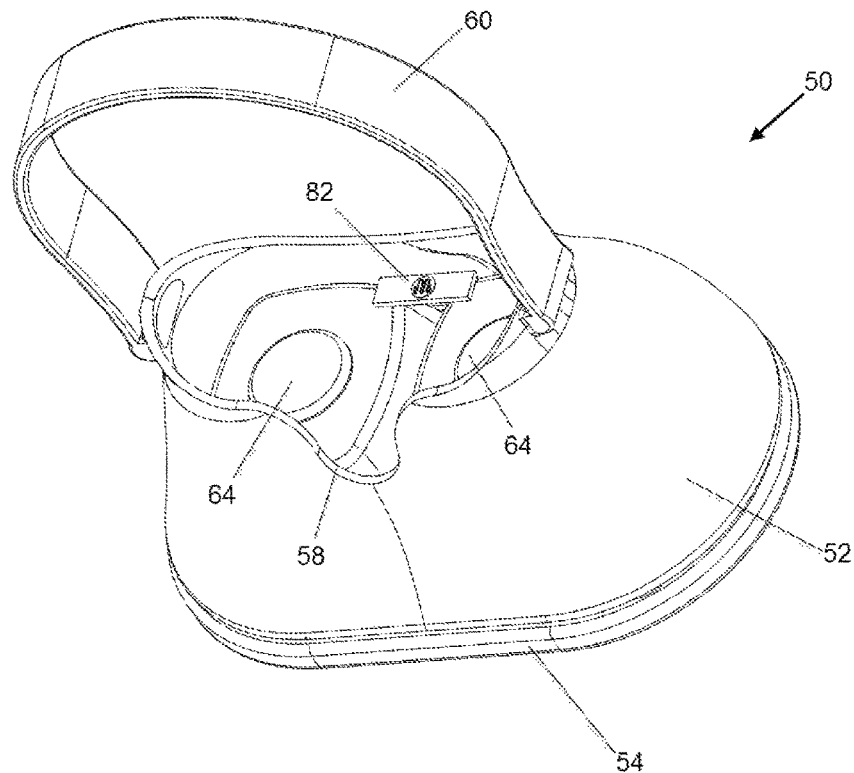
FIG. 9 is a perspective view of a VR headset, according to a second embodiment of the invention, showing details of a light-sensing circuit.

Whichever drive system is used, the particular drive action can be initiated in response to a sensor sensing when the headset 50 is being worn by the user, or not. Applicant contemplates the use of any of several different types of sensors, including a light sensor or a thermal (heat) sensor (for detecting the heat of a user's head, for example, when the headset is being worn). The light sensor is preferred here. It could be a simple light-sensing circuit, such as light sensing circuit 82, shown in FIG. 9, which is mounted within body 52, but facing rearwardly (towards facial cutout 18 and the user's face) and preferably near lenses 64. This type of circuit is well known by those of ordinary skill in the art (and may include various components such as phototransistors, photoresistors and photodiodes), so the details are not required here, but in basic terms, light sensing circuit 82 will detect light entering the shaped facial cutout 18 whenever VR headset 50 is not being worn and should detect no light (or much less light), whenever the VR headset is being worn, since the user's face will block light from entering through the facial cutout 18. Light sensing circuit 82 is preferably positioned adjacent the user's forehead, when the headset is being worn so that it will be shielded from any light generated by display screens 62 during operation of the VR headset.

Although it is likely that only a single light sensor would be required to determine if a VR headset is being worn or not, two or more sensors or means of validation could be used and required to confirm that the headset is indeed, not being worn. For example, an accelerometer can be included to detect movement of headset 50. In this example, a control circuit (microprocessor, memory, etc.—all not shown) could be used to measure the output of both the light-detecting sensor and the accelerometer. Only when light is detected AND movement is not detected will sunshield 66 be deployed. Similarly, sunshield 66 will preferably remain deployed, protecting the optics of headset 50 until the control circuit measures a dark condition from the light-detecting sensor AND reads a "movement" signal from the accelerometers.

When light is detected (beyond a preset threshold value, such as would be the case when the incident light is sunlight), light sensing circuit 82 will cause the drive mechanism (not shown) to drive sunshield 66 from the stowed position to the deployed position, thereby protecting display screens 62 from sunlight damage. The power required to operate sensing circuit 82, and required controlling circuit (not shown), and drive motors (not shown) may be supplied by the same power that is used to operate the VR headset. It is preferred that there be a manual override feature that allows a user to manually deploy sunshield 66 should power not be available, such as if the VR headset is disconnected from a remote power supply.

Light sensing circuit 82 may be used in combination with the above-described manual activation of sunshield 66 and without requiring separate drive motors. In such instance, according to this third embodiment, light sensing circuit would activate a user alert, such as, activating an onboard sound generator, illuminating an LED, or activating a vibration generator, whenever it detected light above a preset threshold. In this arrangement, a dedicated onboard battery (not shown) would be preferred so that the alerting system would be active regardless if the VR headset had operating power or not. The onboard battery would not have to be large and could be recharged whenever the VR headset is used.

Since it is the lenses of the VR headset which convert sunlight into damaging beams of energy, it is preferred to block sunlight before reaching lenses 64. However, according to another embodiment of the invention, applicant contemplates providing a sunshield (not shown, but similar to the ones shown in FIGS. 3-8 and described above) that operates between display screens 62 and their respective lenses 64, again between a stowed position and a deployed position. Similar to the above-described embodiments, the sunshield here would block sunlight from reaching display screens 62, but not until the sunlight passed through lens 64. Depending on the particulars of the lens used, the sunlight entering the lens may be focused somewhat before reaching the sunshield. This focused energy may be sufficient to cause damage to the sunshield itself. It is for this reason, it is preferred that sunshield be arranged to block sunlight before reaching lens 64.

Figure 10:
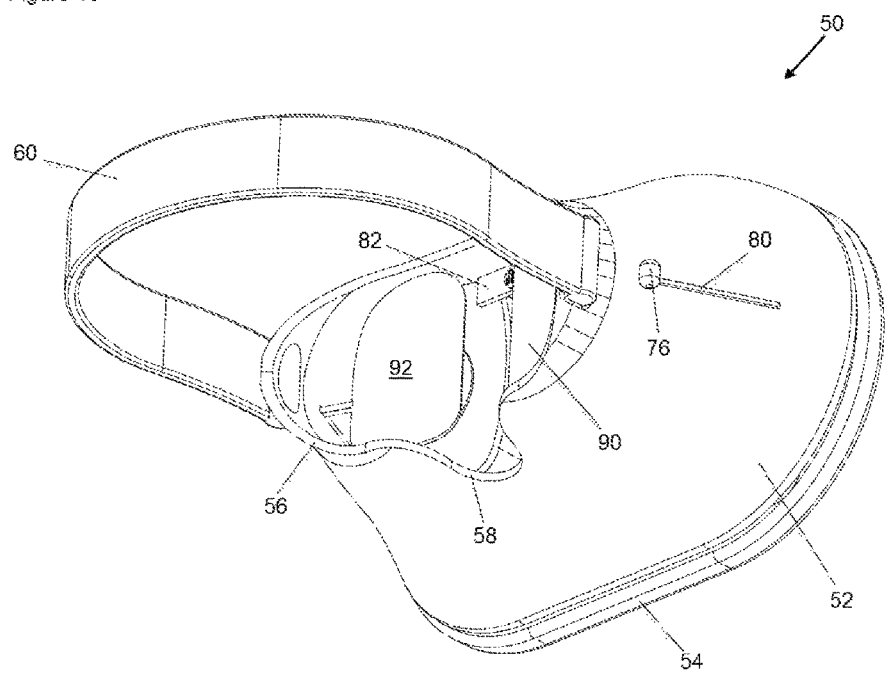
FIG. 10 is a perspective view of a VR headset, according to a third embodiment of the invention, showing details of a headset body, lenses, a headband, and a sunshield, shown in a deployed position, protecting the lenses from entering light.
Figure 11:
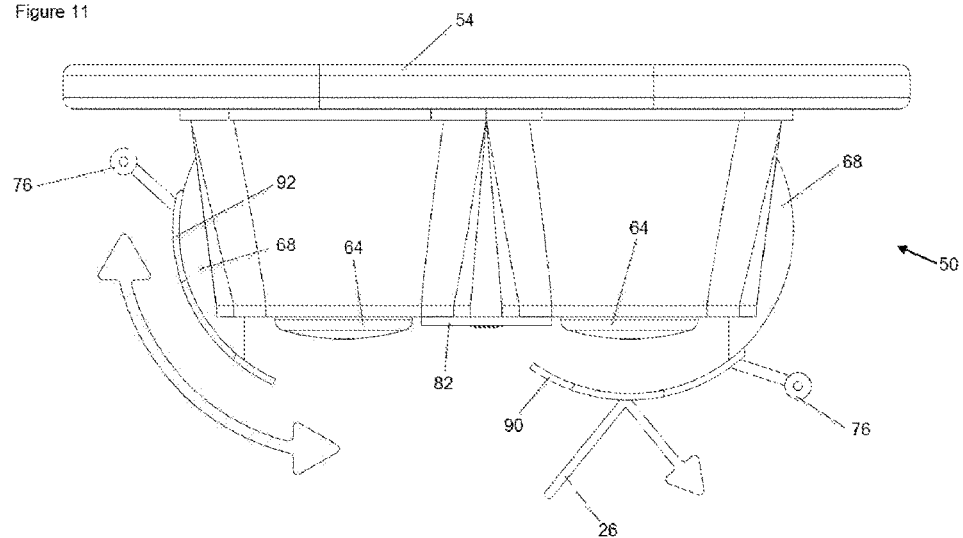
FIG. 11 is a top plan view of the VR headset of FIG. 10, shown without the headset body or headband, to reveal details of the sunshields and the displacement mechanism, according to the third embodiment of the invention, a right-side sunshield is shown deployed, blocking sunlight from entering the right-side lens, while a left-side sunshield is shown retracted, exposing the left side lens.
Figure 12:
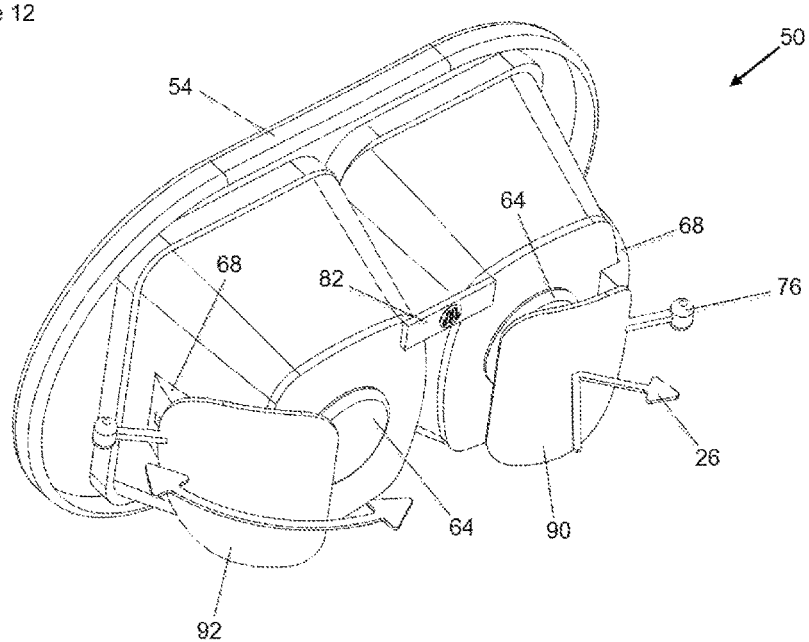
FIG. 12 is a perspective view of the VR headset, of FIG. 11, shown without the headset body or headband, to reveal details of the sunshields and the displacement mechanism, according to the third embodiment of the invention, a right-side sunshield is shown deployed, blocking sunlight from entering the right-side lens, while a left-side sunshield is shown retracted, exposing the left side lens.

Referring to FIGS. 10-12 and according to yet another embodiment of the invention, sunshield 66 is provided as two separate shields, a right shield 90 and a left shield 92. These two shields operate in a similar manner to the single larger sunshield 66, described above, but here operate about two vertical pivot axes, instead of a horizontal pivot axis.

These two smaller shields are mounted to VR body 52 in a similar manner as is sunshield 66 and each is moveable between a stowed position, wherein its respective lens 64 is exposed to light, and a deployed position, wherein its respective lens 64 is covered. FIG. 12 shows the movement of each smaller right and left shield, 90, 92 with the left shield shown in the stowed position and the right shield 90 shown in the deployed position. As in the above-described embodiment, the smaller shields 90, 92 are preferably moved manually by the user when needed in a similar manner as with the single large sunshield 66 (but now the handles 76 protrude VR body 52 at the sides, instead of at the top. Smaller shields may be moved automatically using a motorized drive, controlling circuitry and a light sensing circuit, as in the earlier-described embodiments.

Applicants further contemplate the use of a thermochromic or photochromic filter positioned in front of lens 64, between the lens and display screen 62, or as a coating applied to a surface of the lens (in place of the above-described sunshield). A thermochromic filter changes its light-transmissive characteristics in response to a change in temperature. A photochromic filter darkens in response to incident UV light (UVA light actually). When sunlight attempts to pass through a thermochromic filter, the heat from the beam would instantly cause the filter to change its refractive index, which would cause the transmission of the sunlight very inefficient, effectively decreasing its energy before it reaches the display screen.

Thermochromic and photochromic filters are both normally clear, but will instantly change color (and effectively darken) in response to heat and UVA, such as from a passing beam of sunlight. These types of filters are often used in sunglasses to protect a wearer's eyes.

Other filters may be used in place of the above-described sunshield, including electrochromic filters, liquid-crystal filters, polymer-dispersed-liquid-crystal filters, and suspended-particle filters. These are described in U.S. provisional patent application Ser. No. 60/091,678, filed Jul. 2, 1998 and U.S. patent application Ser. No. 09/347,807, Busbars for Electrically Powered Cells, now U.S. Pat. No. 6,317,248, and filed Jul. 2, 1999, and U.S. patent application Ser. No. 08/914,876, Chromogenic Window Assembly Construction and Other Chromogenic Devices, now U.S. Pat. No. 6,039,390, filed Aug. 20, 1997, each incorporated herein by reference.

An electrochromic filter, such as a liquid crystal display (LCD) uses power to instantly orient suspended particles between two transparent plates, creating an effective opaque screen, or a transparent window. According to yet another embodiment of the invention, an electrochromic filter (not shown) is positioned in front of lenses 64 and are electrically controlled by the above-described control circuit (also not shown). The control circuit would again read the output signals of at least a light sensor (and possibly also an accelerometer) to determine the level of light entering the cutout 58 of body 52 and possibly reaching lenses 64. If the light level exceeds a predetermined threshold of intensity, the control circuit instructs the electrochromic filter to darken and prevent the potentially dangerous light from reaching either lenses 64, or display screens 62. A disadvantage of using any type of filtering, such as those described above is that the filter will never be 100% optically clear and this may affect the visual experience when using the VR headset. For example, a study by the Institute of Ophthalmology at the University College of London has suggested that even in dark conditions photochromic lenses can absorb up to 20% of ambient light.

What is claimed is:

1. A head-mounted electronic device, of the type including a display, to be worn on a user's head and viewed by the user's eyes, said device comprising:
   a body, sized and shaped to be selectively secured to said user's head, said body supporting said display;
   a lens supported by said body and positioned between said user's eyes and said display, when said body is positioned on said user's head, said lens allowing passage of light therethrough; and
   a shield movably mounted to said body, said shield being selectively movable between a blocking position, wherein said shield is positioned between said lens and said user's eyes, and a stowed position, said shield effectively blocking light from passing through said lens when in said blocking position.

2. The head-mounted electronic device, according to claim 1, wherein said shield is pivotally mounted to said body and is pivotally movable about a pivot axis between said stowed position and said blocking position.

3. The head-mounted electronic device, according to claim 2, wherein said pivot axis is horizontally disposed.

4. The head-mounted electronic device, according to claim 2, wherein said pivot axis is vertically disposed.

5. The head-mounted electronic device, according to claim 1, wherein said shield is made from an opaque material.

6. The head-mounted electronic device, according to claim 5, wherein said opaque material is plastic.

7. The head-mounted electronic device, according to claim 1, wherein said shield is manually displaced between said blocking position and said stowed position by said user.

8. The head-mounted electronic device, according to claim 1, further comprising a drive mechanism connected to said shield and a power supply, said drive mechanism selectively being powered by said power supply to force displacement of said shield between said blocking position and said stowed position.

9. The head-mounted electronic device, according to claim 8, further comprising a shroud mounted to said body and surrounding said display, said shroud being sized and shaped to snuggly fit against the user's face during use so that said user may see light emitted from said display through said lens and so that light external to said assembly is blocked from entering said user's eyes.

10. The head-mounted electronic device, according to claim 9, further comprising a light-sensor positioned within said shroud, said light-sensor adapted to detect light from outside said shroud, when said head-mounted display assembly is not being worn by said user, said drive mechanism being activated, in response to said light-sensor detecting light from outside said shroud, to move said shield from said stowed position to said blocking position, thereby preventing light from entering said lens and reaching said display.

11. A head-mounted electronic device, of the type including a display, to be worn on a user's head and viewed by the user's eyes, said device comprising:
   a mask having a strap and being sized and shaped to be selectively secured to said user's head so that said mask fits snuggly on the user's face, said mask defining an open front end positioned away from the user's face, said display being positioned at said open front end of said mask so that said user can view said display when said mask is positioned on said user's head;
   a lens supported by said mask and positioned between at least one of said user's eyes and said display, when said mask is positioned on said user's head, said lens allowing passage of light from said display to said user's eyes, when said mask is being worn by said user, and allowing passage of sunlight to said display, when said mask is detached from said user's head; and a shield movably mounted to said mask, said shield being selectively movable between a blocking position, wherein said shield is positioned between said lens and said user's eyes, and a stowed position, said shield effectively blocking sunlight from passing through said lens and reaching said display, when in said blocking position and when said mask is detached from said user's head.

12. The head-mounted electronic device, according to claim 11, wherein said shield is manually displaced between said blocking position and said stowed position by said user.

13. The head-mounted electronic device, according to claim 11, further comprising a drive mechanism connected to said shield and a power supply, said drive mechanism selectively being powered by said power supply to force displacement of said shield between said blocking position and said stowed position.

14. The head-mounted electronic device, according to claim 13, further comprising a light-sensor positioned within said mask, said light-sensor adapted to detect sunlight entering said mask, when said mask is detached from said user's head, said drive mechanism being activated, in response to said light-sensor detecting sunlight, to move said shield from said stowed position to said blocking position, thereby preventing entering sunlight from passing through said lens and reaching said display.

15. The head-mounted electronic device, according to claim 13, wherein said drive mechanism is activated in response to select video content being transmitted to said display.

16. The head-mounted electronic device, according to claim 13, further comprising a motion detector, wherein said drive mechanism is activated to move said shield from said blocking position to said stowed position in response to said motion detector detecting motion of said user's head, within a prescribed period of time.

17. The head-mounted electronic device, according to claim 16, wherein said drive mechanism is activated to move said shield from said stowed position to said blocking position in response to said motion detector sensing no motion for a prescribed period of time.

18. A head-mounted electronic device, of the type including a display, to be worn on a user's head and viewed by the user's eyes, said device comprising:

a body, sized and shaped to be selectively secured to said user's head, said body supporting said display;

a lens supported by said body and positioned between said user's eyes and said display, when said body is positioned on said user's head, said lens allowing passage of light therethrough; and an electrochromic shield positioned within said body between said display and said eyes of said user, the optical characteristics of said shield being changeable between a transparent condition, wherein light may pass through said shield, and a substantially opaque condition, wherein light is substantially blocked from passing through said shield.

19. The head-mounted electronic device, according to claim 18, wherein said optical characteristics of said electrochromic shield are changed in response to select video content being transmitted to said display.

20. The head-mounted electronic device, according to claim 18, further comprising a motion detector, wherein said optical characteristics of said electrochromic shield are changed in response to said output of said motion detector.

* * * * *